Patented Oct. 5, 1954

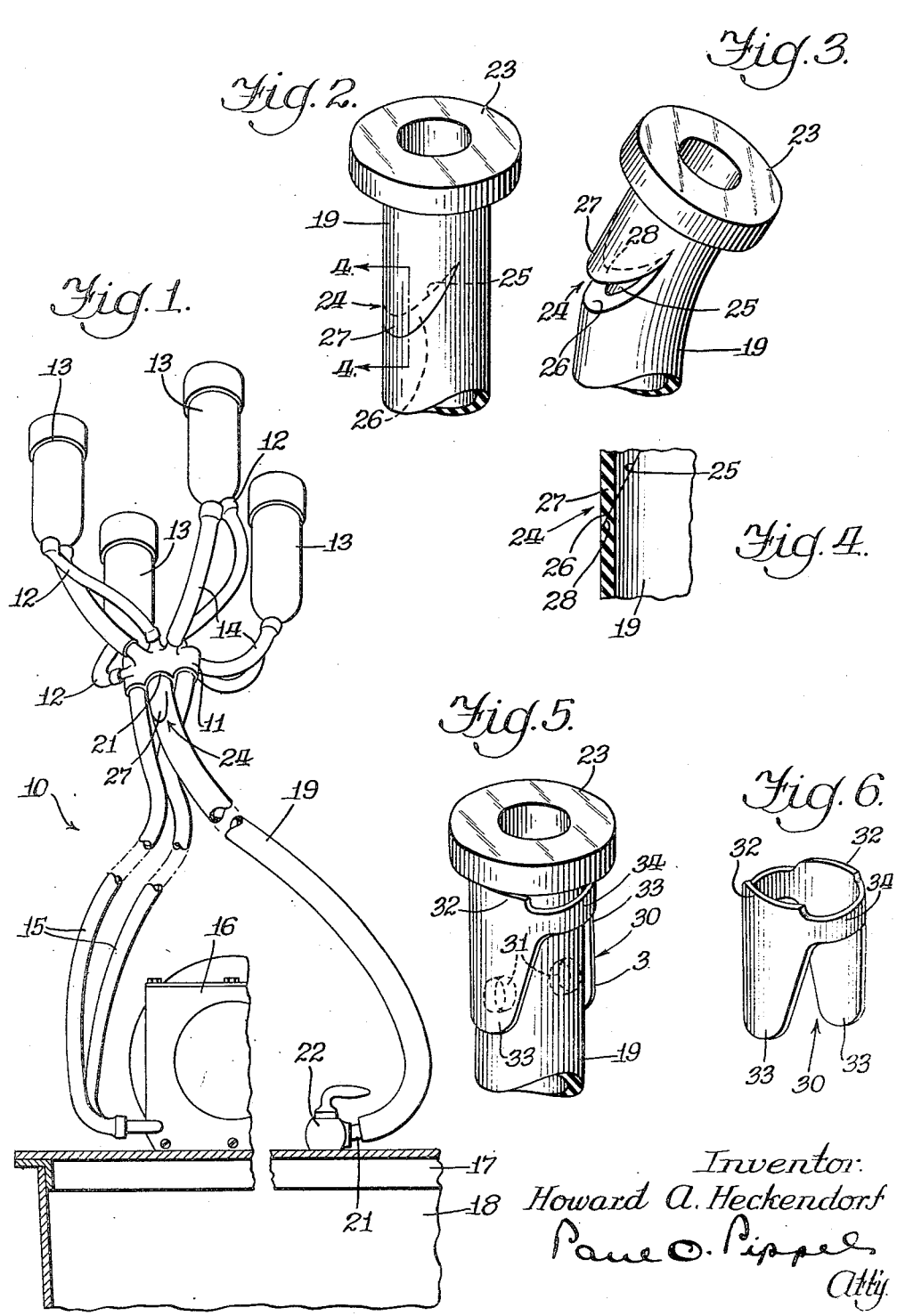

2,690,734

UNITED STATES PATENT OFFICE 2,690,734

PRESSURE RELEASE VALVE FOR MILK HOSE OF MILKING MACHINES

Howard A. Heckendorf, Chicago, Ill., assignor to International Harvester Company, a corporation of New Jersey Application April 18, 1951, Serial No. 221,615

8 Claims. (Cl. 119—14.44)

This invention relates to an improvement in milking machines. More particularly, this invention relates to a valve arrangement connected to the milk hose of a milking machine, the valve arrangement being adapted to vent pressure in the teat cups during a washing operation.

The type of milking machine with which the present invention is concerned consists of a milker claw to which a plurality of teat cups are connected by short vacuum pulsating tubes and milk discharge tubes. The milker claw in turn is connected by a plurality of hoses to a milker receptacle, certain of the hoses being connected to a pulsating device for providing alternate vacuum pulsations within the teat cups. When the milking operation has been completed, it is necessary to flush the interior of the teat cups and the milk and pulsating tubes with a washing solution. The practice generally is to dip the teat cups and the milker claw into a pail filled with a washing solution, whereupon the washing solution is intended to enter into the teat cups and to completely and positively flush the cups and the short lengths of milk tubing.

With the conventional design, it has been found extremely difficult to flush teat cups properly using the mentioned procedure. When the teat cups are immersed in the washing solution, air is trapped within the short lengths of milk tubes and also within the milk hose which extend to the milker receptacle. This trapped air prevents the washing solution from rising up into the teat cups and into the short milk tubes in the desired manner. Thus it is quite often the case that the teat cups and the flexible tubes are improperly cleaned. In order to overcome this deficiency, valve provisions have heretofore been incorporated in the milker claws, these valves being manually operable for venting the interior of the short milk tubes and the teat cups to the atmosphere so that the washing solution can fill the teat cups and the tubes in the desired manner.

The incorporation of a valve in a milker claw, however, presents many difficulties, since any valve provided in a claw necessitates a number of mechanical parts which are extremely difficult to wash and clean. Applicant has overcome this difficulty by providing a vent or pressure release valve in the milk delivery tube, this release valve being automatically operable and effective to vent the interior of the teat cups to the atmosphere during a washing operation.

It is a prime object of the invention, therefore, to provide an improved valve arrangement for venting the teat cups of a milking machine during a washing operation.

Still another object is to provide an improved milk delivery hose connected to a milker claw and a milker receptacle, the milk delivery hose including a valve arrangement for venting the teat cups of the machine to the atmosphere during a positive pressure within the milk delivery hose.

A still further object is to provide an improved flexible milk hose for a milking machine, the milk hose including an integrally formed valve which is automatically operable to release pressure within the milk hose.

A still further object is to provide a valve arrangement for a flexible milk hose, the arrangement including a pair of oppositely disposed flexible flap valves adapted to seal openings formed in the milk hose, during a vacuum depression therein and adapted to open during a positive pressure within the milk hose.

These and other objects will become more readily apparent upon a reading of the specification when taken in connection with the accompanying drawing in which:

Fig. 1 is a perspective view of a milking machine showing portions of a milking receptacle in elevation and in section.

Fig. 2 is an enlarged perspective view of a section of a milk hose showing an improved venting valve arrangement.

Fig. 3 is a view similar to Fig. 2 showing the venting valve of a milk hose in an open position for releasing pressure within the hose.

Fig. 4 is a sectional view of a portion of a milk hose and venting valve, the view being taken substantially along the line 4—4 of Fig. 2.

Fig. 5 is a perspective view of a portion of a milk hose showing a modified form of pressure release or venting valve.

Fig. 6 is a perspective view of a flexible venting or pressure release valve.

Referring now particularly to Fig. 1, the milk machine is generally designated by the reference character 10. The milking machine 10 includes a milker claw 11 which may be of a conventional construction similar to that shown in the Harstick Patent No. 2,524,193, patented October 3, 1950. A claw of this type generally consists of a plurality of passages (not shown) which are adapted to provide for communication between a milk receptacle, a pulsator and the teat cups. The claw 11 is connected by means of short pulsation hoses 12 to a plurality of teat cups 13. The teat cups 13 are also connected by short sections of milk tubes 14 to the milker claw 11. The hoses 12 and 14 are flexible so that the connection to the cow's udder may be readily and easily accomplished. A pair of relatively long pulsation hoses 15 are connected to a pulsator 16. The pulsator 16 may be of conventional design to alternately provide vacuum pulsations in the teat cups. The pulsator 16 is connected to a cover 17 positioned on a milker container or receptacle 18.

A milk hose 19 is connected at one end to the milker claw as indicated in Figure 1. The milk hose 19 may be of rubber or other flexible material and is connected at its other end as indicated at 21 to a pet-cock 22 mounted on the cover 17 and communicating with the receptacle 18. The milk hose 19 is provided at its upper end with a flange 23 which is adapted to be suitably clamped within one of the interior passages (not shown) of the milker claw 11.

A vent or pressure release valve arrangement is generally designated by the reference character 24. The valve arrangement 24 includes a V-shaped opening 25 which is formed in the milk hose 19. A V-shaped valve seat 26 is integrally formed in the milk hose 19 and is contiguous to and coextensive with the V-shaped opening 25. The V-shaped valve flap 27 is integrally formed in the milk hose 19, the valve flap 27 including a sealing surface 28 which is adapted to conform to and engage the valve seat 26 for sealing the opening 25. The valve arrangement 24 is thus integrally formed in the milk hose 19. The valve arrangement can be easily and inexpensively constructed by merely cutting a slit diagonally into the body of the hose.

A modified valve arrangement 30 is shown in Figs. 5 and 6. The modified arrangement 30 includes oppositely disposed openings 31 which are formed in milk hose 19. Flexible flap valves 32 are positioned over the openings 31. Each of the flap valves 32 includes a flexible body 33 extending longitudinally along opposite sides of the milk hose 19. The flexible flap valves 32 may be formed of rubber, leather or any other suitable flexible material. A pair of straps 34 are positioned on opposite sides of the milk hose 19 for connecting the flap valves 32. The straps 34 may be constructed of resilient material so that the flap valves 32 may be resiliently clamped in position on the flexible hose 19.

In the utilization of the preferred embodiment, it can be seen that as long as there is a vacuum or minus pressure within the milk hose 19, the flap valve 27 is in sealing relation against the valve seat 26 so that the interior hose 19 is sealed from the atmosphere. Thus milk as it is drawn from the animals is discharged through the milk hose 19 into the receptacle 18. After the milking operation has been concluded, the vacuum to the teat cups and to the milk hose is shut off and the cups are removed from the cow's udder for washing. Flexing movement of the milk hose 19 at this stage will, of course, provide for the opening of the valve 27 as shown in Fig. 3. In other words, by bending the hose in a direction whereby the valve 24 will be on the outside of the bend, the valve will pop open to relieve any vacuum remaining in the hose. Positive pressure within the hose during washing of the teat cups will also accomplish this function. In other words as the teat cups are tipped down in an inverted position into a washing solution, any air trapped in the milk hose or teat cups is discharged through the V-shaped opening 25, since the valve flap 27 will be forced into open position. Thus any air trapped within the teat cups can be released so that washing solution may readily travel upwardly into the remote parts of the milking machine that are sought to be washed.

The modification shown in Figs. 5 and 6 functions in a similar manner. During a vacuum depression within the milk hose 19, the flaps 32 are effective to seal the openings 31. After the vacuum is shut off and the teat cups are washed, the air pressure within the milk hose 19 and teat cups is released, since the flaps 32 will be moved to an open position.

It can now be seen that the novel valve arrangements shown completely achieve the objects of the invention. It must be understood that changes and further modifications may be made without departing from the spirit of the invention as disclosed or the scope thereof as defined in the appended claims.

What is claimed is:

1. In a milking machine including teat cups adapted to connect to a source of vacuum, the improvement comprising a milk conduit connected to the teat cups and adapted to connect to a milk receiving unit under vacuum, a pressure release valve connected to the conduit between the ends thereof said conduit including an opening adjacent the pressure release valve and adapted to be sealed by the pressure release valve in response to minus pressure within the conduit, the valve being displaceable from the opening in response to a positive pressure within the conduit.

2. In a milking machine including teat cups adapted to connect to a source of vacuum, the improvement comprising a flexible rubber-like milk hose connected to the teat cups and adapted to connect to a milk receiving receptacle under vacuum, a pressure release valve connected to the hose between the ends thereof, said hose including an opening adjacent said valve and adapted to be sealed by said pressure release valve in response to minus pressures within the hose, the valve being displaceable from the opening in response to a positive pressure within the hose and upon the flexing of the same.

3. In a milking machine in accordance with claim 2 wherein the pressure release valve is integrally formed with the flexible hose.

4. In a milking machine including teat cups, a milker claw connected to the teat cups, the improvement comprising; a milk hose connected to the milker claw, said hose consisting of flexible rubber-like material and being adapted to connect to a milk receiving means under vacuum, a valve connected to the hose between the ends thereof, said hose including a substantially V-shaped opening adjacent said valve, and a V-shaped flexible valve seat contiguous to and coextensive with said opening, said valve including a flexible valve element integrally formed with the hose and having a sealing portion conforming to the shape of the valve seat for engaging the same and sealing the opening in response to a vacuum depression within the hose, the valve element being displaceable from said valve seat during positive pressure in the hose.

5. In a milking machine including teat cups adapted to be connected to a source of vacuum, the improvement comprising a milk conduit connected to the teat cups and adapted to connect to a milker receptacle under vacuum, a pressure release valve disposed between the ends of the conduit, said conduit having a pair of openings positioned at opposite sides thereof, a valve for regulating said openings, said valve including a pair of valve flaps extending longitudinally along the conduit and positioned to cover and seal said openings during a vacuum depression within the conduit, and a pair of straps positioned on opposite sides of the conduit for connecting said valve flaps and for partially encircling the conduit to support the valve in position thereon, said flaps being hingedly movable free of the openings during a positive pressure within the conduit.

6. In a milking machine including a plurality of teat cups adapted to be connected to a source of alternating vacuum pulsations, the improvement comprising, a flexible milk conduit connected to the teat cups and adapted to connect to a milker receptacle under vacuum, said conduit having a plurality of openings disposed in opposite sides thereof, a valve positioned for regulating said openings, said valve including valve flaps disposed on opposite sides of the openings, said valve flaps being constructed of flexible rubber-like material, resilient straps positioned on opposite sides of the conduit for connecting said flaps and for resiliently securing the flaps in position on the conduit, the valve flaps being movable in response to vacuum within the conduit for sealing the openings and movable free of the openings in response to pressure within the conduit.

7. In a milking machine including a plurality of teat cups adapted to be connected to a source of alternating vacuum pulsations, the improvement comprising, a flexible milk conduit connected to the teat cups and adapted to connect to a milker receptacle under vacuum, said conduit having an opening in a side thereof, a valve connected to the conduit for regulating said opening, said valve including a rubber-like flexible flap connected over said opening, the flap being adapted to seal the opening in response to a vacuum depression within the conduit, and being hingedly movable away from the opening during a positive pressure within the conduit.

8. In a flexible milk hose adapted to be connected at one end to a receptacle under vacuum and at its other end to the teat cups of a milking machine, a pressure release valve connected to said hose, said hose having a V-shaped opening formed therein, and a U-shaped valve seat contiguous and coextensive with said opening, said pressure release valve including a flexible valve flap integrally formed in said hose, said valve flap having a portion adapted to conform to and engage the V-shaped valve seat during a vacuum depression within the hose for sealing said opening, the valve flap being releasable from over the opening during a positive pressure in the hose.

References Cited in the file of this patent

UNITED STATES PATENTS

| Number | Name | Date |
|---|---|---|
| 1,016,004 | Gane | Jan. 30, 1912 |
| 1,236,431 | Hawley | Aug. 14, 1917 |
| 1,289,706 | Eggers | Dec. 31, 1918 |
| 2,083,704 | Hall et al. | June 15, 1937 |
| 2,275,937 | Baker | Mar. 10, 1942 |
| 2,565,059 | Altsheler | Aug. 21, 1951 |

FOREIGN PATENTS

| Number | Country | Date |
|---|---|---|
| 100,262 | Germany | Mar. 19, 1898 |